United States Patent
Schumacher et al.

(10) Patent No.: US 11,634,094 B2
(45) Date of Patent: Apr. 25, 2023

(54) METHODS AND SYSTEMS FOR SECURE COMMUNICATION AND AUTHORIZATION OF VEHICLE MODE CHANGE

(71) Applicant: THERMO KING LLC, Minneapolis, MN (US)

(72) Inventors: Ryan Wayne Schumacher, Bloomington, MN (US); Bryce Butler, Minneapolis, MN (US); Michael James Vanous, Minneapolis, MN (US); Matthew Srnec, Minnetonka, MN (US); Tracey Patterson, Lakeville, MN (US)

(73) Assignee: THERMO KING LLC, Minneapolis, MN (US)

( * ) Notice: Subject to any disclaimer, the term of this patent is extended or adjusted under 35 U.S.C. 154(b) by 606 days.

(21) Appl. No.: 16/678,672

(22) Filed: Nov. 8, 2019

(65) Prior Publication Data
US 2021/0138982 A1 May 13, 2021

(51) Int. Cl.
*G06F 7/00* (2006.01)
*H04B 7/24* (2006.01)
(Continued)

(52) U.S. Cl.
CPC ............. *B60R 16/033* (2013.01); *B60D 1/62* (2013.01); *H04W 4/40* (2018.02); *H04W 12/06* (2013.01); *H04W 12/08* (2013.01)

(58) Field of Classification Search
CPC ...... B60R 16/033; H04W 4/40; H04W 12/06; H04W 12/08; B60D 1/62
(Continued)

(56) References Cited

U.S. PATENT DOCUMENTS

| 5,901,572 | A | * | 5/1999 | Peiffer | ............... | B60H 1/32014 |
| | | | | | | 62/480 |
| 6,223,546 | B1 | | 5/2001 | Chopko et al. | | |

(Continued)

FOREIGN PATENT DOCUMENTS

| EP | 2679418 | 1/2014 |
| EP | 2031443 | 5/2016 |

(Continued)

OTHER PUBLICATIONS

Extended European Search Report, issued in the corresponding European patent application No. 20206327.7, dated Mar. 10, 2021, 7 pages.

*Primary Examiner* — Mark G. Pannell
(74) *Attorney, Agent, or Firm* — Hamre, Schumann, Mueller & Larson, P.C.

(57) ABSTRACT

Electrically powered accessories connected to vehicle power systems are authenticated, and connections between the accessories and the vehicle power systems are based on permissions resulting from that authentication. accessories may supply authentication information associated with an authentication level, and form a permitted connection based on the authentication level. Vehicle power systems may obtain the authentication information, obtain the authentication level, and operate a power connection according to the authentication level. Authentication information can be obtained from the component or from a user of the component through, for example, a portable device. A system may include the electrically powered component and the vehicle power system. The system may further include a remote server to process the authentication information and determine the authentication level.

19 Claims, 4 Drawing Sheets

(51) Int. Cl.
- *B60R 16/033* (2006.01)
- *H04W 4/40* (2018.01)
- *B60D 1/62* (2006.01)
- *H04W 12/06* (2021.01)
- *H04W 12/08* (2021.01)

(58) Field of Classification Search
USPC .......................................................... 701/36
See application file for complete search history.

(56) References Cited

U.S. PATENT DOCUMENTS

| | | | |
|---|---|---|---|
| 6,271,745 B1* | 8/2001 | Anzai | G07C 9/37 |
| | | | 340/5.23 |
| 7,904,219 B1* | 3/2011 | Lowrey | G08G 1/20 |
| | | | 701/32.3 |
| 8,000,858 B2 | 8/2011 | Tonegawa et al. | |
| 8,478,913 B2* | 7/2013 | Terlizzi | G06F 21/44 |
| | | | 710/72 |
| 9,024,579 B2 | 5/2015 | Igata | |
| 9,024,586 B2 | 5/2015 | Vance et al. | |
| 9,627,902 B2 | 4/2017 | Kamishima | |
| 10,107,536 B2 | 10/2018 | Senf, Jr. et al. | |
| 10,112,487 B1 | 10/2018 | Lee et al. | |
| 10,183,563 B2* | 1/2019 | Rayner | B62K 27/003 |
| 10,317,119 B2 | 6/2019 | Zou | |
| 10,369,896 B2 | 8/2019 | Namuduri et al. | |
| 10,538,220 B1* | 1/2020 | Tyagi | G07C 9/00309 |
| 2002/0133716 A1* | 9/2002 | Harif | G07C 9/27 |
| | | | 726/9 |
| 2003/0189482 A1* | 10/2003 | Arshad | B60R 25/04 |
| | | | 340/5.24 |
| 2003/0222500 A1* | 12/2003 | Bayeur | B60R 25/04 |
| | | | 307/10.2 |
| 2005/0001431 A1 | 1/2005 | Sauer et al. | |
| 2005/0148334 A1* | 7/2005 | Peeters | H04B 7/15507 |
| | | | 455/436 |
| 2006/0053814 A1 | 3/2006 | Naik et al. | |
| 2006/0178756 A1* | 8/2006 | Gotoh | G07C 9/257 |
| | | | 700/65 |
| 2007/0000712 A1* | 1/2007 | Kamiya | B60R 25/24 |
| | | | 180/287 |
| 2007/0124599 A1* | 5/2007 | Morita | B60R 25/255 |
| | | | 726/19 |
| 2007/0212598 A1 | 9/2007 | Iida et al. | |
| 2008/0116830 A1 | 5/2008 | Gonzalez et al. | |
| 2010/0271172 A1 | 10/2010 | Takikita | |
| 2011/0144844 A1* | 6/2011 | Ishibashi | H04L 9/3234 |
| | | | 320/109 |
| 2011/0185196 A1* | 7/2011 | Asano | B60L 53/51 |
| | | | 713/300 |
| 2011/0213983 A1 | 9/2011 | Staugaitis et al. | |
| 2011/0270480 A1* | 11/2011 | Ishibashi | B60L 53/65 |
| | | | 320/135 |
| 2013/0029595 A1* | 1/2013 | Widmer | B60L 53/124 |
| | | | 455/39 |
| 2014/0049216 A1 | 2/2014 | Nakagawa et al. | |
| 2015/0298680 A1 | 10/2015 | Matthews | |
| 2016/0306350 A1* | 10/2016 | Shim | G07C 9/00309 |
| 2017/0072813 A1 | 3/2017 | Martin et al. | |
| 2018/0065446 A1 | 3/2018 | Hansson et al. | |
| 2018/0273018 A1 | 9/2018 | Follen et al. | |
| 2019/0183438 A1 | 6/2019 | Lee et al. | |
| 2019/0184483 A1 | 6/2019 | Lee et al. | |
| 2019/0193523 A1 | 6/2019 | Takeuchi et al. | |
| 2019/0243962 A1* | 8/2019 | Hofer | H01M 10/425 |
| 2019/0286164 A1* | 9/2019 | Skaaksrud | G05D 1/021 |
| 2019/0291665 A1 | 9/2019 | Martin | |
| 2020/0070777 A1* | 3/2020 | Chen | G06F 3/017 |
| 2020/0079322 A1* | 3/2020 | Crocker | G07C 9/00571 |
| 2020/0177398 A1* | 6/2020 | Takemori | H04L 63/0823 |

FOREIGN PATENT DOCUMENTS

| | | |
|---|---|---|
| JP | 6351301 | 7/2018 |
| WO | 2006132070 | 12/2006 |
| WO | 2010/002644 | 1/2010 |
| WO | 2010009502 | 1/2010 |
| WO | 2010094302 | 8/2010 |
| WO | 2010145971 | 12/2010 |
| WO | 2011/078109 | 6/2011 |
| WO | 2014/002244 | 1/2014 |

* cited by examiner

METHODS AND SYSTEMS FOR SECURE COMMUNICATION AND AUTHORIZATION OF VEHICLE MODE CHANGE

FIELD

This disclosure is directed to vehicle power systems and electrically-powered vehicle accessories, particularly authenticating an electrically-powered accessory configured to be used with at least one of the vehicle, a trailer, and a transport container to access power from the vehicle power system.

BACKGROUND

Combustion engine powered vehicles can use a power take-off (PTO) to power auxiliary accessories, such as various tools, climate control systems, and the like. The PTO directs mechanical energy to the auxiliary component. The power take-off may use a specific physical interface between the vehicle and the component to ensure only authorized accessories are used. Further, risk to the vehicle engine and power train may be limited by the mechanical design of the PTO, for example, clutches, differentials, or the like. In a traditional PTO in a combustion engine vehicle, the engine must be in use for power to be supplied. This may also reduce the risk of unauthorized access to available power from the PTO due to the presence of an operator.

Electrical accessories typically use standard power connections or connections that may be easy to physically mimic. Further, allowing electrical connections to unauthorized devices may allow theft, hacking, or cause damage to vehicle power system accessories, either through incompatibility or defects such as faults within the device connected to the power connection.

SUMMARY

This disclosure is directed to vehicle power systems and electrically-powered vehicle accessories, particularly authenticating an electrically-powered accessory configured to be used with at least one of the vehicle, a trailer, and a transport container to access power from the vehicle power system.

An authentication system allows an electrical connection to be provided on a vehicle while reducing or eliminating the risk of unauthorized third-party access power or the attachment of malfunctioning or incompatible devices. The authentication system can use multiple levels of authorization to allow, for example, installation of accessories into the vehicle power system or overriding of modes such as a vehicle-off state or a load-shedding state to provide power to an authenticated component. The authenticated component may be an accessory, such as a transport climate control system including an electrically powered compressor and at least one electrically-powered fan.

In an embodiment, a vehicle power and accessory system includes an electrically-powered accessory configured to be used with at least one of the vehicle, a trailer, and a transport container and a vehicle power system. The vehicle power system includes a battery, an electrical connection point, and a controller. The controller is configured to receive authentication information for the electrically powered accessory configured to be used with at least one of the vehicle, a trailer, and a transport container and direct an operation of the electrical connection point based on an authentication level for the electrically powered accessory configured to be used with at least one of the vehicle, a trailer, and a transport container. The electrically-powered accessory configured to be used with at least one of the vehicle, a trailer, and a transport container is connected to the electrical connection point. The authentication level is based on the authentication information for the electrically powered accessory configured to be used with at least one of the vehicle, a trailer, and a transport container.

In an embodiment, the electrically powered accessory configured to be used with at least one of the vehicle, a trailer, and a transport container includes a wired connection to the vehicle power system and the controller is configured to receive the authentication information from the electrically powered accessory configured to be used with at least one of the vehicle, a trailer, and a transport container by way of the wired connection.

In an embodiment, the vehicle power system includes a wireless communications receiver, and the controller is configured to receive the authentication information from the wireless communications receiver.

In an embodiment, the controller is further configured to determine the authentication level based on the authentication information.

In an embodiment, the vehicle power system includes a wireless communication antenna, and the controller is further configured to direct transmission of the authentication information to a remote server by way of the wireless communication antenna, and receive the authentication level from the remote server.

In an embodiment, the operation of the electrical connection point includes supplying power from the battery to the electrically powered accessory configured to be used with at least one of the vehicle, a trailer, and a transport container when the vehicle power and accessory system is in a vehicle-off mode.

In an embodiment, the operation of the electrical connection point includes supplying power to the electrically powered accessory configured to be used with at least one of the vehicle, a trailer, and a transport container when the vehicle power and accessory system is in a load-shedding mode.

In an embodiment, the operation of the electrical connection point includes certifying the electrically-powered accessory configured to be used with at least one of the vehicle, a trailer, and a transport container for use in the vehicle power and accessory system.

In an embodiment, a vehicle power system includes a battery, an electrical connection point configured to provide electrical power to an electrically-powered accessory configured to be used with at least one of the vehicle, a trailer, and a transport container, and a controller. The controller is configured to obtain authentication information for the electrically-powered accessory configured to be used with at least one of the vehicle, a trailer, and a transport container, obtain an authentication level for the electrically-powered accessory configured to be used with at least one of the vehicle, a trailer, and a transport container, and direct a connection operation between the vehicle power system and the electrically-powered accessory configured to be used with at least one of the vehicle, a trailer, and a transport container based on the authentication level of the electrically-powered accessory configured to be used with at least one of the vehicle, a trailer, and a transport container.

In an embodiment, the connection operation includes supplying power from the vehicle power system to the electrical connection point. In an embodiment, the supplying of power from the vehicle power system at the electrical connection point occurs while a vehicle including the vehicle power source is in an off state. In an embodiment the supplying of power from the vehicle power system at the electrical connection point occurs while a vehicle including the vehicle power source is in an off state.

In an embodiment, the connection operation comprises certifying the electrically-powered accessory configured to be used with at least one of the vehicle, a trailer, and a transport container for use with the vehicle power system and permitting a connection between the vehicle power system and the electrically-powered accessory configured to be used with at least one of the vehicle, a trailer, and a transport container at the electrical connection point.

In an embodiment, the vehicle power system further includes a wireless communication antenna, and the processor is configured to obtain the authentication information by receiving the authentication data from the wireless communication antenna.

In an embodiment, the controller is configured to obtain the authentication information by way of a wired connection between the vehicle power system and the electrically-powered accessory configured to be used with at least one of the vehicle, a trailer, and a transport container.

In an embodiment, the controller is configured to obtain the authentication level for the electrically-powered accessory configured to be used with at least one of the vehicle, a trailer, and a transport container by processing the authentication information from the vehicle power system to determine the authentication level.

In an embodiment, the vehicle power system further includes a wireless communication antenna. The controller is configured to obtain the authentication level for the electrically-powered accessory configured to be used with at least one of the vehicle, a trailer, and a transport container by directing transmission of the authentication information from the vehicle power system to a remote server by way of the wireless communication antenna, and receiving the authentication level for the electrically-powered accessory configured to be used with at least one of the vehicle, a trailer, and a transport container from the remote server by way of the wireless communication antenna.

In an embodiment, the controller is further configured to monitor the vehicle power system for an unauthorized access attempt and disabling at least a portion of the vehicle power system when the monitoring detects the unauthorized access attempt.

In an embodiment, a method of connecting an electrically-powered accessory configured to be used with at least one of the vehicle, a trailer, and a transport container to a vehicle power system includes providing authentication information for the electrically-powered accessory configured to be used with at least one of the vehicle, a trailer, and a transport container to a vehicle power control of the vehicle power system and forming a permitted connection selected from a plurality of permitted connections between the electrically-powered accessory configured to be used with at least one of the vehicle, a trailer, and a transport container and the vehicle power system. The permitted connection is selected based on an authentication level. The authentication information determines an authentication level of the accessory configured to be used with at least one of the vehicle, a trailer, and a transport container.

In an embodiment, providing the authentication information includes providing a signal including the authentication information by way of a wired connection configured to be connected to the vehicle power system.

In an embodiment, providing the authentication information includes wireless transmission of the authentication information from a portable device or the electrically-powered accessory configured to be used with at least one of the vehicle, a trailer, and a transport container to the vehicle power system, and the permitted connection includes the accessory configured to be used with at least one of the vehicle, a trailer, and a transport container receiving power from the vehicle power system.

In an embodiment, the accessory configured to be used with at least one of the vehicle, a trailer, and a transport container receiving power from the vehicle power system occurs while a vehicle including the vehicle power source is in an off state.

In an embodiment, the accessory configured to be used with at least one of the vehicle, a trailer, and a transport container receiving power from the vehicle power system occurs while the vehicle power source is in a load-shedding state.

In an embodiment, providing the authentication information includes providing authentication information from a maintenance tool to the vehicle power system, and the permitted connection includes certifying the accessory configured to be used with at least one of the vehicle, a trailer, and a transport container for use in the vehicle power system.

In an embodiment, the permitted connection is established at an electronic power take-off of the vehicle power system.

In an embodiment, the electrically-powered accessory configured to be used with at least one of the vehicle, a trailer, and a transport container is a transport climate control system.

DRAWINGS

DETAILED DESCRIPTION

This disclosure is directed to vehicle power systems and electrically-powered vehicle accessories, particularly authenticating an electrically-powered accessory configured to be used with at least one of the vehicle, a trailer, and a transport container to access power from the vehicle power system.

Figure 1:
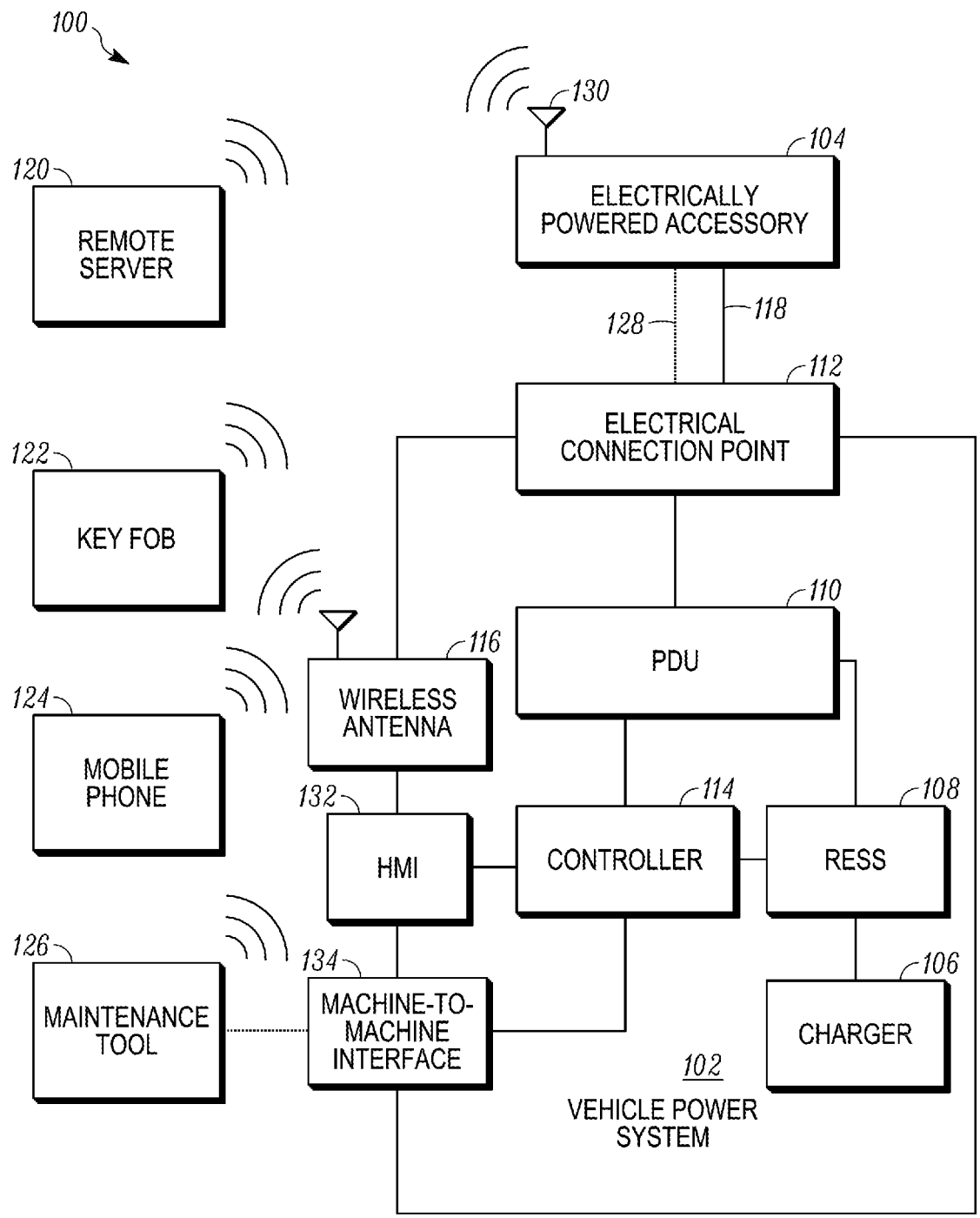
FIG. 1 shows a schematic of a system for authenticating a connection between a vehicle power system and an electrically-powered accessory configured to be used with at least one of the vehicle, a trailer, and a transport container according to an embodiment.

FIG. 1 shows a schematic of a system 100 for authenticating a connection between a vehicle power system 102 and an electrically-powered accessory 104 configured to be used with at least one of the vehicle, a trailer, and a transport container according to an embodiment.

Vehicle power system 102 is a power system included in a vehicle, for example, in a tractor, a straight truck, a van, a bus, or the like. The vehicle including vehicle power system 102 may be, for example, a hybrid electric and combustion vehicle or a purely electrically powered vehicle.

Vehicle power system 102 includes an on-board charger 106, a rechargeable energy storage system (RESS) 108, a power distribution unit (PDU) 110, and an electrical connection point 112. Vehicle power system 102 further includes controller 114. Optionally, vehicle power system 102 includes a wireless communication antenna 116, operatively connected to the controller 114 to allow communication to the controller 114 by way of the wireless communication antenna 116.

On-board charger 106 is a charger for RESS 108 that is included in vehicle power system 102. On-board charge 106 may be connected to, for example, a shore power connection, an alternator of a prime mover such as a combustion or hybrid engine, or any other suitable source of electrical power that can be applied to charge RESS 108.

RESS 108 may include one or more rechargeable batteries configured to be charged by the on-board charger 106 and supply power to vehicle power system 102, for example through PDU 110. RESS 108 may provide power to the electrical connection point 112 included in vehicle power system 102. RESS 108 may include, for example, a battery management system to control operations of the RESS such as charging, temperature management, and the like, and determine and/or communicate the status of the RESS such as a state of charge of the one or more batteries of the RESS 108.

PDU 110 is a system that allocates power among various loads on or included in the vehicle power system 102. PDU 110 is connected to RESS 108 such that it can draw power from the RESS 108 that may then be supplied to loads connected to the PDU 110. The one or more loads on or included in the vehicle power system 102 that are connected to PDU 110 include electrical connection point 112, and may further include one or more vehicle components and/or vehicle accessories. PDU 110 may provide the power as DC power or AC power. Power supplied by PDU 110 may have a fixed voltage and/or frequency or a controllable voltage and/or a controllable frequency.

One of the loads supplied power from vehicle power system 102, for example through PDU 110, is electrical connection point 112. Electrical connection point 112 may be an interface allowing an electrically powered accessory such as the electrically-powered accessory configured to be used with at least one of the vehicle, a trailer, and a transport container 104 to be connected to vehicle power system 102 and to receive power therefrom. The interface for transferring power to the electrically-powered accessory configured to be used with at least one of the vehicle, a trailer, and a transport container 104 may be, for example, an outlet, a cable, one or more conductive prongs, one or more plugs, or any other suitable form for an electrical connection. Electrical connection point 112 may further include a load monitor configured to measure at least one of voltage, current, or frequency of the electricity supplied at the electrical connection point 112. Electrical connection point 112 may be located at or on an exterior of the vehicle including vehicle power system 102. Electrical connection point 112 may be at an electrical power take-off (ePTO) provided on the vehicle including vehicle power system 102. Electrical connection point 112 may include a connection allowing a wired connection capable of transmitting authentication information from the electrically-powered accessory configured to be used with at least one of the vehicle, a trailer, and a transport container 104 to the vehicle power system 102.

Controller 114 is a controller configured to at least control the supply of power provided at electrical connection point 112. In an embodiment, controller 114 is configured to obtain authentication information, obtain an authentication level, and direct a connection operation.

Controller 114 may obtain authentication information from, for example, a wired connection formed at electrical connection 112. Controller 114 may obtain authentication information from another physical connection providing the authentication data, such as human-machine interface (HMI) 132 or machine-to-machine interface 134. Controller 114 may obtain authentication information from wireless communication antenna 116, for example through a wireless connection to remote server 120 and/or one or more portable devices such as, for example, key fob 122, mobile phone 124, and/or maintenance tool 126.

In an embodiment, controller 114 may obtain the authentication level for obtained authentication information by, for example, directly processing the authentication information to determine the authentication level at the controller 114 itself. In an embodiment, controller 114 may direct wireless communication antenna 116 to transmit the authentication information to, for example, remote server 120, and to subsequently receive the authentication level associated with the transmitted authentication information, as determined by remote server 120. Controller 114 may direct the connection operation by, for example, directing PDU 110 to supply power to electrical connection 112. Controller 114 may be further configured to end the supply of power and/or require subsequent authentication for further supply of power from the PDU 110 to the electrical connection 112. The electrical connection 112, when receiving power from PDU 110, may in turn supply power to the electrically-powered accessory configured to be used with at least one of the vehicle, a trailer, and a transport container 104.

Optionally, vehicle power system 102 includes wireless communication antenna 116, operatively connected to the controller 114 to allow communication to and/or from the controller 114 by way of the wireless communication antenna 116.

In an embodiment, wireless communication antenna 116 provides communication with remote server 120, for example by way of a wireless mobile internet connection, either directly or through one or more additional devices such as a mobile phone or tablet of a driver of the vehicle. In this embodiment, wireless communication antenna 116 may transmit information to remote server 120 including authentication information obtained by the controller 114 and may receive information from remote server 120 including, for example, an authentication level that is determined at the remote server 120 based on the authentication information.

In an embodiment, wireless communication antenna 116 may be a wireless communication antenna configured to connect to one or more nearby portable devices, In this embodiment, the wireless communication antenna 116 may connect to the portable devices through, for example, Wi-Fi, Bluetooth, ZigBee, near-field communications (NFC), RFID, or any other suitable wireless connection to the one or more portable devices. The one or more portable devices may include, for example, key fob 122, mobile phone 124, and/or maintenance tool 126.

In an embodiment, a switch or other HMI 132 may be provided in a driver compartment of the vehicle. In an embodiment, the HMI 132 may be used to allow a user such as a driver of the vehicle to activate or deactivate the electrical connection point 112. In an embodiment, HMI 132 may be used to activate or deactivate the authentication process carried out at least in part by controller 114. In an embodiment, the HMI 132 may be used to allow a user to enter or otherwise supply at least a portion of the authentication information. In an embodiment, the HMI 132 may query a user for authentication required for a change to the vehicle power system 102 such as installing or modifying a component of the vehicle power system 102 or drawing power at an electrically-powered accessory configured to be used with at least one of the vehicle, a trailer, and a transport container 104, for example by displaying a prompt on a display requesting the authentication. In an embodiment, the level of authentication required for the change to the vehicle power system 102 can be included in the displayed prompt.

In an embodiment, a physical machine-to-machine interface 134 may be included in vehicle power system 102. The machine-to-machine interface 134 may be, for example, a port configured to accept a maintenance tool such as maintenance tool 126 and form a wired connection to exchange data such as maintenance logs, vehicle power system 102 status information, and/or authentication information, such as authentication information for the electrically-powered accessory configured to be used with at least one of the vehicle, a trailer, and a transport container 104 during installation or maintenance by personnel carrying maintenance tool 126. In an embodiment, the maintenance tool 126 includes a hardware-based key such as a HASP key. In an embodiment, the hardware-based key is required to access particular levels of authority such as integrator or OEM levels of authority.

The electrically-powered accessory configured to be used with at least one of the vehicle, a trailer, and a transport container 104 is an accessory load to be used with the vehicle including vehicle power system 102. The electrically-powered accessory configured to be used with at least one of the vehicle, a trailer, and a transport container 104 is configured to connect to vehicle power system 102 and receive power therefrom. The electrically-powered accessory configured to be used with at least one of the vehicle, a trailer, and a transport container 104 may be, for example, powered equipment such as compressors, pumps, mixers, or any other suitable electrically-powered equipment compatible with electric power from the electrical connection point 112.

In an embodiment, the electrically-powered accessory configured to be used with at least one of the vehicle, a trailer, and a transport container 104 is a transport climate control system associated with a space included in the vehicle, on a trailer, or in a transport container. An electrically powered transport climate control system may include one or more electrically powered compressors and one or more electrically powered evaporator fans. The transport climate control system may include further electrically-powered components such as electronic expansion valves, controllers, chargers for one or more on-board batteries of the transport climate control system, and the like.

In other embodiments, the electrically-powered accessory configured to be used with at least one of the vehicle, a trailer, and a transport container 104 may be, for example, a crane attached to a vehicle; a cement mixer attached to a truck; one or more food appliances of a food truck; a boom arm attached to a vehicle; a concrete pumping truck; a refuse truck; a fire truck (with a power driven ladder, pumps, lights, or the like); suitable combinations thereof, or the like.

The electrically-powered accessory configured to be used with at least one of the vehicle, a trailer, and a transport container 104 may require continuous power even when the ignition of the vehicle is turned off or the vehicle is parked, idling, charging, or combinations thereof. The accessory electrical component may require substantial power to operate, continuous operation, autonomous operation (e.g., controlling temperature/humidity/airflow of a climate-controlled space) on an as needed basis, or combinations thereof, independent of the operational mode of the vehicle.

In an embodiment, the electrically-powered accessory configured to be used with at least one of the vehicle, a trailer, and a transport container 104 includes an electrical interface 118 configured to engage with the electrical connection point 112 of vehicle power system 102. The electrical interface may be any suitable interface for connecting with the electrical connection point 112, such as a plug corresponding to an outlet or vice versa or any other suitable electrical interface.

In an embodiment, the electrical interface 118 includes a wired communications line 128 configured to be connected to vehicle power system 102 to supply authentication information for electrically-powered accessory configured to be used with at least one of the vehicle, a trailer, and a transport container 104.

In an embodiment, the electrically-powered accessory configured to be used with at least one of the vehicle, a trailer, and a transport container 104 includes an accessory wireless antenna 130. Accessory wireless antenna may be configured to provide a wireless connection to one or more of vehicle power system 102, remote server 120, and/or portable devices such as key fob 122, mobile phone 124, or maintenance tool 126. The wireless connection may be, for example, a wireless data connection such as 4G, LTE or the like, Wi-Fi, Bluetooth, ZigBee, NFC, RFID, or any other suitable wireless connection based on the devices that are in communication. In an embodiment, the accessory wireless antenna 130 transmits authentication information from the electrically-powered accessory configured to be used with at least one of the vehicle, a trailer, and a transport container 104 to the vehicle power system 102. In an embodiment, the accessory wireless antenna 130 receives at least a portion of the authentication information from remote server 120, and/or portable devices such as key fob 122, mobile phone 124, or maintenance tool 126. In an embodiment, the accessory wireless antenna transmits at least part of the authentication information to remote server 120, and/or portable devices such as key fob 122, mobile phone 124, or maintenance tool 126.

Figure 2:
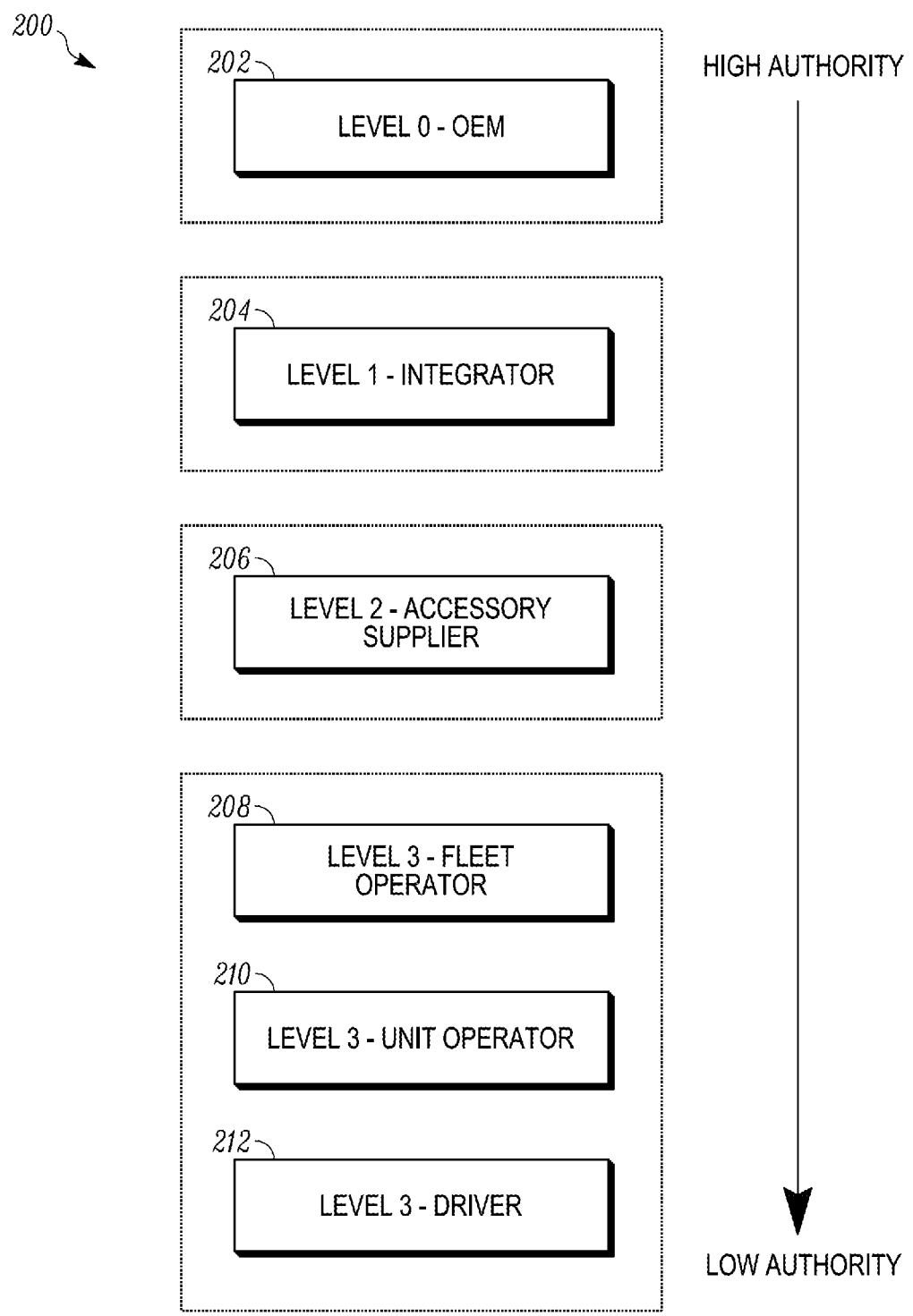
FIG. 2 shows a hierarchy of authentication levels according to an embodiment.

FIG. 2 shows a hierarchy 200 of authentication levels according to an embodiment. The hierarchy 200 may include multiple levels of authentication that govern the permitted connections between a vehicle power system and an electrically-powered accessory configured to be used with at least one of the vehicle, a trailer, and a transport container. The hierarchy may include an original equipment manufacturer (OEM) 202 for the vehicle power system, integrators 204, accessory suppliers 206, fleet operators 208, unit operators 210, and drivers 212. The position of an electrically-powered accessory configured to be used with at least one of the vehicle, a trailer, and a transport container within hierarchy 200 may be based on the source of the component, the party carrying out installation of that component, or the party connecting the component to the vehicle power system.

The OEM 202 is the original manufacturer of a vehicle power system. Electrically-powered accessories configured to be used with at least one of the vehicle, a trailer, and a transport container from, installed by, or maintained by the OEM 202 may be known or assumed to be compatible and authorized for use with the vehicle power system. The OEM 202 may also be a service provider for maintenance, repair, and replacement of these accessories. In an embodiment, a component is identified as having OEM 202 level authentication based on the component being identified as being from the OEM 202, for example by an identifier code included in the authentication information. In an embodiment, a component is identified as having OEM 202 level authentication based on a source of authentication information, for example through a maintenance tool or other portable device, such as a mobile device, key fob, or other such suitable sources of authentication information. The authentication information provided by the source may be provided during, for example, maintenance or replacement operations including the component. Authentication at the OEM 202 level may permit, for example, full access of the component to the features of the vehicle power system including controls, certification of Accessories for future use without additional authentication, access to power from the vehicle power system regardless of a state of the vehicle power system, or access to power from the vehicle power system subject to the state of the vehicle power system.

Integrators 204 are parties that combine third-party electrically-powered accessories configured to be used with at least one of the vehicle, a trailer, and a transport container with Accessories from OEM 202, including, for example, installation, building of integrated systems, repair, and maintenance. accessories may be identified as having integrator-level authentication by, for example, a source of authentication information provided during the integration process, for example through a maintenance tool or other portable device, such as a mobile device, key fob, or other such suitable sources of authentication information. The authentication information provided by the source may be provided during, for example, installation, maintenance or replacement operations including the component. Authentication at the integrator 204 level may permit, for example, certification of Accessories for future use without additional authentication, access to power from the vehicle power system regardless of a state of the vehicle power system, or access to power from the vehicle power system subject to the state of the vehicle power system. In an embodiment, authorization at the integrator 204 level may include changing a component from being registered to one vehicle to being registered to another vehicle. In an embodiment, authorization at the integrator 204 level may include modifying one or more operational parameters of a vehicle power system such as vehicle power system 102 described above, to support an accessory being connected by the integrator 204. In an embodiment, the modification of the one or more operational parameters includes changing a voltage and/or a frequency of power supplied to an accessory. In an embodiment, the modification of the one or more operational parameters includes changing when power is made available, for example allowing an accessory to be provided power by the vehicle power system during a deactivated or off state of the vehicle.

Accessory suppliers 206 are parties that supply, install, maintain, and/or repair third-party accessories for use in or with vehicle power systems. In an embodiment, an electrically-powered accessory configured to be used with at least one of the vehicle, a trailer, and a transport container is identified as having accessory supplier 206 level authentication based on the component being identified as being from the accessory supplier 206, for example by an identifier code included in the authentication information. In an embodiment, a component is identified as having accessory supplier 206 level authentication based on a source of authentication information, for example through a maintenance tool or other portable device, such as a mobile device, key fob, or other such suitable sources of authentication information. The authentication information provided by the source may be provided during, for example, maintenance or replacement operations including the component. Authentication at the accessory supplier 206 level may permit, for example, certification of accessories for future use without additional authentication, access to power from the vehicle power system regardless of a state of the vehicle power system, access to power from the vehicle power system regardless of a state of the vehicle power system, or access to power from the vehicle power system subject to the state of the vehicle power system.

Fleet operators 208 are owners and operators of multiple vehicles. In an embodiment, a component is identified as having fleet operator 208 level authentication based on, for example, instructions or parts of instructions from fleet management software, or authentication information particularly associated with a fleet operator 208 provided through a maintenance tool or other portable device, such as a mobile device, key fob, or other such suitable sources of authentication information. Fleet operators 208 as owners of the vehicles and accessory components may be provided a wide range of authority regarding permitted connections. The fleet operator 208 level of authentication may permit, for example, full access of the component to the features of the vehicle power system including controls, certification of accessories for future use without additional authentication, access to power from the vehicle power system regardless of a state of the vehicle power system, or access to power from the vehicle power system subject to the state of the vehicle power system. Some activities permitted to fleet operators 208 may be associated with warranty violations. In an embodiment, activities in that category, such as certifying unapproved parts, may lead to a vehicle power system or a vehicle itself being flagged as in violation of warranty terms. In an embodiment, activities associated with warranty violations that are available fleet operators 208 may require a prompt or confirmation before proceeding with the activity.

Unit operators 210 may include owners of one of the vehicle or the electrically-powered accessory configured to be used with at least one of the vehicle, a trailer, and a transport container. For example, unit operators 210 may include vehicle owner-operators, owners and operators of the vehicle accessory such as owners of a transport container including a transport climate control system. Unit operator 210 level authentication may be provided through one or more portable devices, such as a mobile device, key fob, or other such suitable sources of authentication information, a switch or other human-machine interface included on or in the vehicle, or on the accessory itself such as provided by a wired or wireless connection when connected. The unit operator 210 level of authentication may permit, for example, certification of accessories for future use without additional authentication, access to power from the vehicle power system regardless of a state of the vehicle power system such as a load-shedding mode, a range-extending mode, an off or inactive mode, or the like, or access to power from the vehicle power system subject to the state of the vehicle power system. In an embodiment, unit operator 210 level authentication allows prioritization of loads on the vehicle power system, such as giving a transport climate control system preference over vehicle operations to ensure protection of a climate-sensitive load. Some activities permitted to unit operators 210 may be associated with warranty violations. In an embodiment, activities in that category, such as certifying unapproved parts, may lead to a vehicle power system or a vehicle itself being flagged as in violation of warranty terms.

Drivers 212 include operators of vehicles including an electrically-powered accessory configured to be used with at least one of the vehicle, a trailer, and a transport container. In an embodiment, driver 212 level authentication may be based on a source of authentication information, a portable device, such as a mobile device, key fob, or other such suitable sources of authentication information, a switch or other HMI included on or in the vehicle, or on the accessory itself such as provided by a wired or wireless connection when connected. The driver 212 level of authentication may permit, for example, access to power from the vehicle power system regardless of a state of the vehicle power system, or access to power from the vehicle power system subject to the state of the vehicle power system.

In an embodiment, these levels may be arranged in tiers, such as Level 0 including the OEM 202, Level 1 including integrators 204, Level 2 including accessory suppliers 206, and Level 3, including fleet operators 208, unit operators 210, and drivers 212.

Level 0 may be the most comprehensive tier of authentication, with the least restrictive set of permitted connections that may be formed. In the hierarchy shown in FIG. 2, Level 0 includes the OEM 202.

Level 1 may be a second tier of authentication, more restrictive than Level 0, but including a larger set of permitted connections than lower levels. In the hierarchy shown in FIG. 2, Level 1 includes the integrators 204.

Level 2 may be a second tier of authentication, more restrictive than Level 1, but may include a larger set of permitted connections than Level 3, or, alternatively have the permitted connections be free of warranty implications. In the hierarchy shown in FIG. 2, Level 2 includes the accessory suppliers 206.

Level 3 may be a final tier of authentication. Level 3 may include the most restrictive set of permitted connections. Alternatively, level 3 may include a broader set of permitted connections, however some permitted connections may carry flags identifying warranty breaches for vehicle power systems, electrically-powered accessory configured to be used with at least one of the vehicle, a trailer, and a transport container, or other such components depending on the formation of connections when compared to authentication data. In the hierarchy shown in FIG. 2, Level 3 includes the fleet operators 208, unit operators 210, and drivers 212.

There may be further gradations with respect to permitted connections or methods of authentication within each of the levels. For example, while each of fleet operators 208, unit operators 210, and drivers 212 may be included in Level 3 of a hierarchy, the permitted connections available to each individual group may vary individually by the particular level of authentication, for example, the fleet operator 208 or unit operator 210 may include permitted connections having warranty implications whereas those connections are prohibited to drivers 212.

The gradations may also be used in resolution of conflicts among multiple members of the same level. For example, within Level 3, a fleet operator 208 may take precedence over a driver 212 in the event of a conflict, or vice versa. An example of a conflict may be, for example, where the permitted connection is overriding a load-shedding mode of the vehicle to continue to supply power to, for example, a transport climate control unit. Where conflicting instructions regarding the permitted connection are provided, an authentication level for each instruction may be compared and an instruction selected based on one or more predetermined conflict rules.

Figure 3:
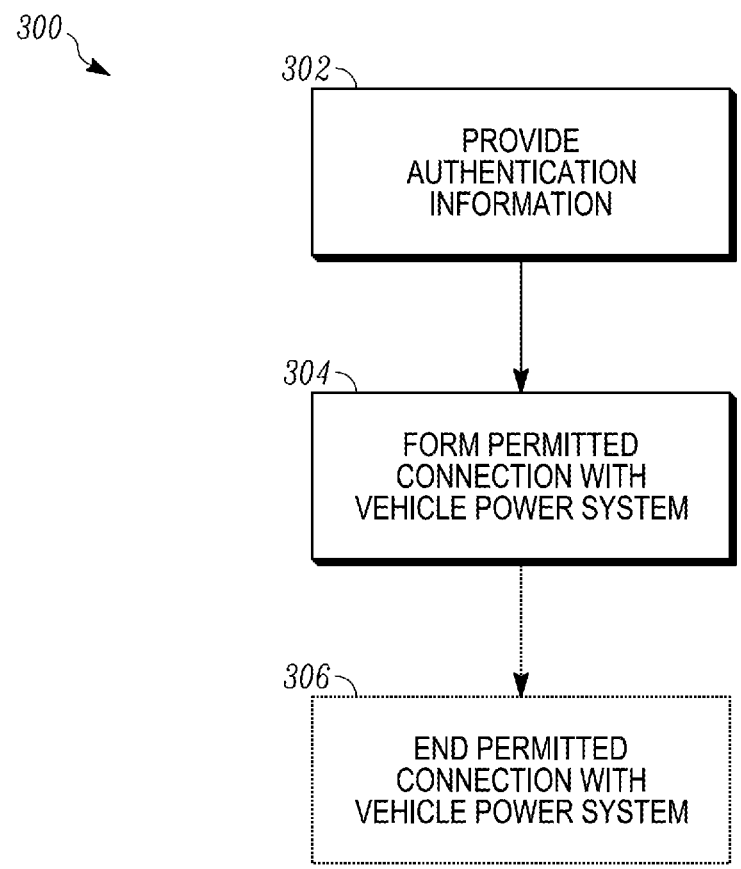
FIG. 3 shows a method of connecting an electrically-powered component to a vehicle power system according to an embodiment.

FIG. 3 shows a method of connecting an electrically-powered accessory configured to be used with at least one of the vehicle, a trailer, and a transport container to a vehicle power system according to an embodiment. Method 300 includes providing authentication information for an electrically-powered accessory configured to be used with at least one of the vehicle, a trailer, and a transport container at 302 and forming a permitted connection selected from a plurality of permitted connections at 304. Optionally, method 300 includes ending the authentication period for the electrically-powered accessory configured to be used with at least one of the vehicle, a trailer, and a transport container at 306.

Authentication information is provided at 302. The authentication information is information associated with an authentication level for operation of the electrically-powered accessory configured to be used with at least one of the vehicle, a trailer, and a transport container, such as the authentication levels provided in hierarchy 200 described above. The authentication information may be provided at 302 by the electrically-powered accessory configured to be used with at least one of the vehicle, a trailer, and a transport container or by another authentication information source. Authentication information sources include, for example, key fobs, mobile devices such as cellular phones or tablets, remote servers, such as servers of an enterprise system, a fleet management software system, an authentication server, or the like, maintenance tools, wired connections between the electrically-powered accessory configured to be used with at least one of the vehicle, a trailer, and a transport container and the vehicle power system, wireless connections between electrically-powered accessory configured to be used with at least one of the vehicle, a trailer, and a transport container and the vehicle power system, and the like.

The authentication information may include information associating the electrically-powered accessory configured to be used with at least one of the vehicle, a trailer, and a transport container with an authentication level, such as one of the authentication levels provided in hierarchy 200 shown in FIG. 2 and discussed above. The authentication information may include a device identifier classifying the electrically-powered accessory configured to be used with at least one of the vehicle, a trailer, and a transport container or providing specific identification, such as a model number or individual serial number for the accessory. In an embodiment, the authentication information includes status data for the electrically-powered accessory configured to be used with at least one of the vehicle, a trailer, and a transport container such as, for example, maintenance logs, service logs, fault records, or other such information relating to the state and performance of the electrically-powered accessory.

The authentication information provided at 302 may be secured through one of more techniques, including being provided on a wired connection, encryption of communications, use of multiple sources for the authentication information, or use of blockchain technologies. The use of a wired connection to secure the provision of authentication information may include use of a specialized connector, providing mechanical specificity to the connection by which the authentication information is provided. The use of a wired connection may provide the authentication information via the electrical connection between a vehicle power system and the electrically-powered accessory configured to be used with at least one of the vehicle, a trailer, and a transport container to prevent counterfeiting of mechanical components. Encryption of communications may include encryption at one or more of a communications level, a software level, or at a hardware level such as onboard chips dedicated to encryption and decryption of authentication information on the vehicle power system and the electrically-powered accessory configured to be used with at least one of the vehicle, a trailer, and a transport container. Multiple sources of authentication could be used, such as a multi-factor authentication security architecture, using one or more sources of secondary authentication information to confirm or supplement authentication information provided from a first authentication information source. Each of the primary and secondary authentication sources may be suitable sources of authentication information disclosed herein, including, as non-limiting examples, key fobs, mobile devices, remote servers, maintenance tools, wired connections between the electrically-powered accessory configured to be used with at least one of the vehicle, a trailer, and a transport container and the vehicle power system, wireless connections between electrically-powered accessory configured to be used with at least one of the vehicle, a trailer, and a transport container and the vehicle power system, and the like. In an embodiment, the one or more sources of secondary authentication information are associated with a level of authentication required for a requested permitted connection. For example, secondary authentication information can be requested from an integrator to form a permitted connection requiring integrator level authentication, even if the initial request is made using a lower level of authentication.

In an embodiment, providing the authentication information at 302 can be logged, for example by being added to a record. The record can use unique, independently verifiable, and/or immutable records for each time authentication information is provided. The records can include, for example, a token, an entry in an authorization tracking database or an entry on a blockchain ledger. In an embodiment, the record includes a time and/or a location where authentication is provided 302. In an embodiment, the record includes a vehicle identification number (VIN), an ID number for one or more of the accessory to be connected through the permitted connection, an OEM or dealer providing the vehicle and/or the accessory, an owner of the vehicle and/or the accessory, or the like. In an embodiment, the authorization tracking database is stored in a memory of a remote server or in cloud storage. In an embodiment, the record includes the permitted connection associated with the provision of authentication information at 302. In an embodiment, the record includes an event triggering the provision of the authentication information at 302, such as conditions leading to a user being queried for the authentication information. In an embodiment, the record includes the authentication level associated with the authentication information provided at 302 and/or the authentication level associated with the permitted connection that is to be formed at 304.

A permitted connection is formed at 304. The permitted connection may be, for example, one of the permitted connections from hierarchy 200 described above, selected based on the electrically-powered accessory configured to be used with at least one of the vehicle, a trailer, and a transport container that is being connected and the authentication level associated with the authentication information provided at 302. The permitted connection may include one or more of full access of the electrically-powered accessory configured to be used with at least one of the vehicle, a trailer, and a transport container to the features of the vehicle power system including controls, certification of the electrically-powered accessory configured to be used with at least one of the vehicle, a trailer, and a transport container for future use without additional authentication, access of the electrically-powered accessory configured to be used with at least one of the vehicle, a trailer, and a transport container to power from the vehicle power system regardless of a state of the vehicle power system, or access of the electrically-powered accessory configured to be used with at least one of the vehicle, a trailer, and a transport container to power from the vehicle power system subject to the state of the vehicle power system. In an embodiment, the permitted connection formed at 304 is a change in an operation mode of the electrically-powered accessory configured to be used with at least one of the vehicle, a trailer, and a transport container. The change in operation mode may be a change that affects the power draw of the electrically-powered accessory configured to be used with at least one of the vehicle, a trailer, and a transport container. The change in operation mode may be, for example, changing a transport climate control system from a standby mode to a temperature pulldown mode. In an embodiment, the permitted connection formed at 304 is formed at an electrical connection point included in the vehicle power system.

In an embodiment, forming the permitted connection at 304 may further include attaching a flag or an identifier to the connection of the electrically-powered accessory configured to be used with at least one of the vehicle, a trailer, and a transport container with the vehicle. Attachment of the flag or identifier may be based on the authentication level and the permitted connection, for example, when the permitted connection formed at 304 is between components that are not approved, but the permitted connection is allowed due to an authentication level such as a fleet operator or unit operator level, the electrically-powered accessory configured to be used with at least one of the vehicle, a trailer, and a transport container may store an identifier in memory logging this connection. The log of the connection may indicate, for example, that a warranty has been breached.

Optionally, method 300 includes ending the permitted connection formed at 304 based on a condition at one or both of the electrically-powered accessory configured to be used with at least one of the vehicle, a trailer, and a transport container and the vehicle power system at 306. In an embodiment, the permitted connection may be ended at 306 when the electrically-powered accessory configured to be used with at least one of the vehicle, a trailer, and a transport container is disconnected from the vehicle power system, for example when the accessory has not been certified, and is disconnected. In an embodiment, the permitted connection formed at 304 may be specific to an operating mode of the electrically-powered accessory configured to be used with at least one of the vehicle, a trailer, and a transport container, and may be ended at 306 when the operating mode of the accessory changes. In an embodiment, the permitted connection formed at 304 may be limited to or overridden by a mode or status of the vehicle, such as a vehicle power system entering a load-shedding or range extension mode. In this embodiment, the mode of the vehicle may trigger ending of the permitted connection at 306. In an embodiment, the permitted connection may end at 306 periodically, on a schedule or after a predetermined time, so that authentication of the electrically-powered accessory configured to be used with at least one of the vehicle, a trailer, and a transport container is repeated periodically.

Figure 4:
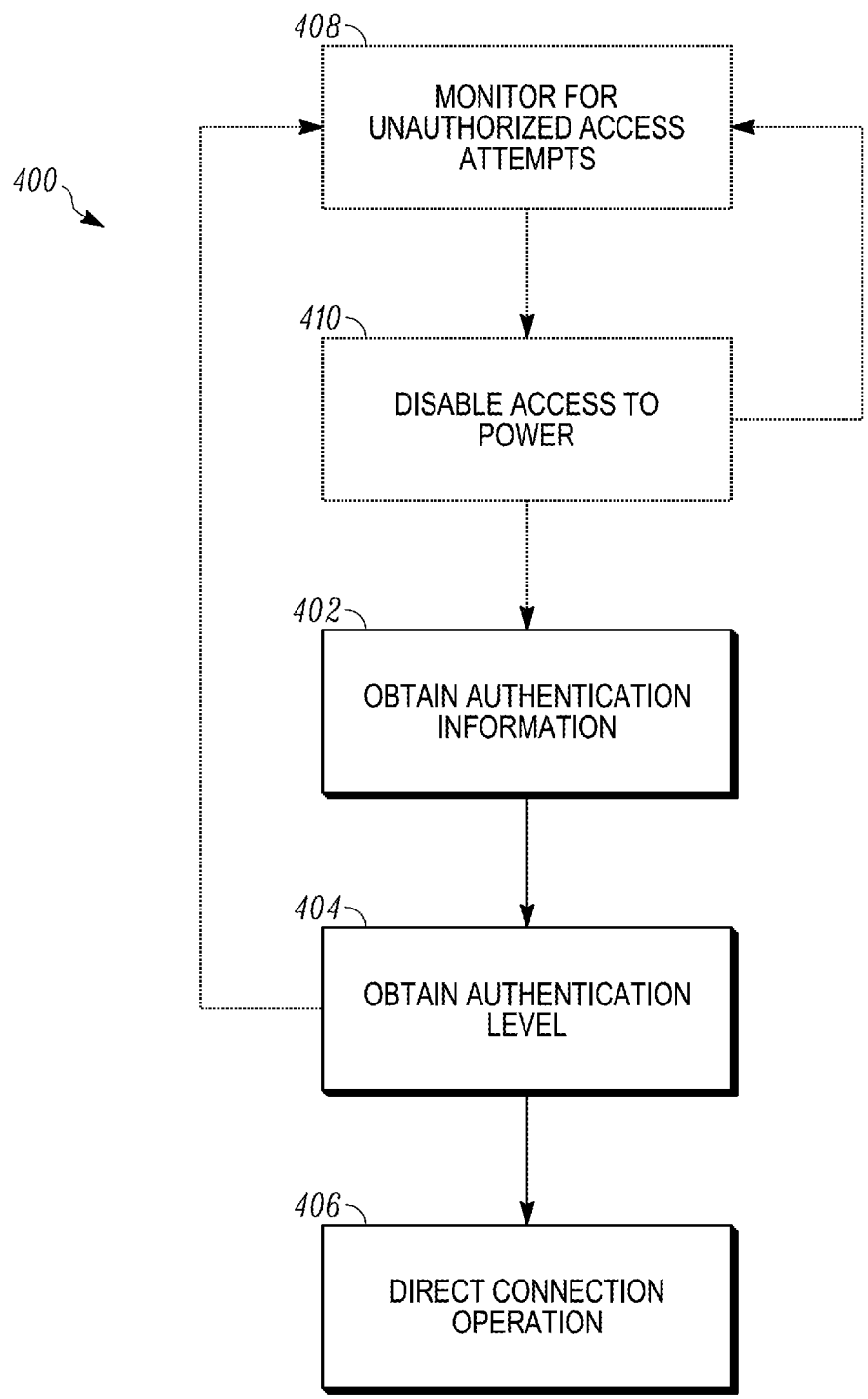
FIG. 4 shows a method of authenticating a component being connected to a vehicle power system according to an embodiment.

FIG. 4 shows a method 400 of authenticating an electrically-powered accessory configured to be used with at least one of the vehicle, a trailer, and a transport container being connected to a vehicle power system according to an embodiment. The method of authentication includes obtaining authentication information for the component at 402, obtaining an authentication level for the electrically-powered accessory configured to be used with at least one of the vehicle, a trailer, and a transport container at 404, and directing a connection operation between the vehicle power system and the electrically-powered accessory configured to be used with at least one of the vehicle, a trailer, and a transport container at 406. Optionally, method 400 further includes monitoring for unauthorized access attempts 408. Method 400 further may optionally include disabling access to power at 410.

Authentication information for the electrically-powered accessory configured to be used with at least one of the vehicle, a trailer, and a transport container is obtained at 402. The authentication information may be obtained at or near the vehicle such as from a wired connection, a key fob or HMI on the vehicle, or remotely such as from a server, a mobile device, or the like. Remote sources of authentication information may allow authentication and operation of the electrically-powered accessory configured to be used with at least one of the vehicle, a trailer, and a transport container when a driver is away from the vehicle. The authentication information may be obtained by one or more of, as non-limiting examples, key fobs, use of an HMI or switch located in or on the vehicle, mobile devices such as mobile phones, tablets, or the like, remote servers, maintenance tools, wired connections between the electrically-powered accessory configured to be used with at least one of the vehicle, a trailer, and a transport container and the vehicle power system, wireless connections between electrically-powered accessory configured to be used with at least one of the vehicle, a trailer, and a transport container and the vehicle power system, and the like. The authentication information is information associating connection of the electrically-powered accessory configured to be used with at least one of the vehicle, a trailer, and a transport container with an authentication level for the connection. In an embodiment, the authentication information obtained at 402 includes status data for the electrically-powered accessory configured to be used with at least one of the vehicle, a trailer, and a transport container such as, for example, maintenance logs, service logs, fault records, or other such information relating to the state and performance of the electrically-powered accessory.

An authentication level for the electrically-powered accessory configured to be used with at least one of the vehicle, a trailer, and a transport container is obtained at 404. The authentication level is an authentication level for the connection of the electrically-powered accessory configured to be used with at least one of the vehicle, a trailer, and a transport container with the vehicle power system, for example one of the authentication levels shown in FIG. 2 and described above.

Optionally, obtaining the authentication level for the electrically-powered accessory configured to be used with at least one of the vehicle, a trailer, and a transport container at 404 includes processing the authentication information obtained at 402 to determine the authentication level. The authentication information is associated with an authentication level, and the association can be determined by processing at a controller included in the vehicle power system. The authentication information may, for example, include a code identifying an authentication level, a code identifying the electrically-powered accessory configured to be used with at least one of the vehicle, a trailer, and a transport container that can be cross-referenced with a table of approved devices, a code identifying an installer or user, or the like, and combinations thereof. In an embodiment, processing the authentication information includes comparing the authentication information to a table of codes corresponding directly to authentication levels. In an embodiment, processing the authentication information includes comparing the authentication information to a table of device identifiers and associated authentication levels for identified devices. In an embodiment, processing the authentication information includes combining a first source of authentication information with a second source of authentication information and comparing the combined authentication information to codes corresponding directly to authentication levels.

Processing the authentication information may further include processing the status data, for example processing the status data to determine if the electrically-powered accessory configured to be used with at least one of the vehicle, a trailer, and a transport container is in a normal operational state. In an embodiment, processing the status data may include determining that the electrically-powered accessory configured to be used with at least one of the vehicle, a trailer, and a transport container is unsuitable for use, for example being out of performance specifications, subject to one or more electrical faults, out of its maintenance schedule, or otherwise unsuitable or risky for electrical connection to the vehicle power system. In an embodiment, processing the status data includes detecting a deviation from expected operational conditions at the vehicle power system. Such unexpected deviation in vehicle power system operational conditions can be indicative of one or more attempts to form a connection without authorization.

Optionally, obtaining the authentication level for the electrically-powered accessory configured to be used with at least one of the vehicle, a trailer, and a transport container at 404 may include transmitting the authentication information to a remote server and receiving the authentication information from the remote server. The remote server may process the authentication information to determine the authentication level received by the vehicle power system. Processing at the remote server may include, for example, querying a user at the vehicle or separate from the vehicle, such as a fleet operator, to confirm the request for authentication and/or provide additional authentication information. Processing of the authentication information at the remote server to determine the authentication level at the server may include the comparisons of authentication information directly or through device identifiers as described above. Processing of the authentication information at the remote server may further include processing of the status data for the electrically-powered accessory configured to be used with at least one of the vehicle, a trailer, and a transport container as described above. Processing the authentication at a remote server can allow centralized control of authentication. Centralized control of authentication can allow for frequent or real-time updates to authentication levels associated with authentication information, for example allowing frequent or even real-time updating of policies, fixing of bugs in permissions, and the like. In an embodiment, the remote server can refuse or limit authentication requests from particular users, for example from users that have been associated with connection operations that are not allowed by higher levels within the hierarchy of authentication levels.

A connection operation between the vehicle power system and the electrically-powered accessory configured to be used with at least one of the vehicle, a trailer, and a transport container at is directed by a controller of the vehicle power system at 406. The connection operation may be one or more of, for example, providing the electrically-powered accessory configured to be used with at least one of the vehicle, a trailer, and a transport container full access to the features of the vehicle power system including controls, certification of the electrically-powered accessory configured to be used with at least one of the vehicle, a trailer, and a transport container for future use without additional authentication, access of the electrically-powered accessory configured to be used with at least one of the vehicle, a trailer, and a transport container to power from the vehicle power system regardless of a state of the vehicle power system, or access of the electrically-powered accessory configured to be used with at least one of the vehicle, a trailer, and a transport container to power from the vehicle power system subject to the state of the vehicle power system. In an embodiment, the connection operation directed at 406 is directed to be performed by an electrical connection point included in the vehicle power system, such as an electric power take-off. In an embodiment, the connection operation is a change of power provided at the electrical connection point that corresponds to a change in mode of an electrically-powered accessory configured to be used with at least one of the vehicle, a trailer, and a transport container. The connection operation to be performed at the electrical connection point may include, for example, supplying power such that it is available at the electrical connection point to a connected device such as an electrically-powered accessory configured to be used with at least one of the vehicle, a trailer, and a transport container with the vehicle power system. The connection operation may be directed at 406 by sending a command to, for example, a battery management system, one or more switches within the vehicle power system, or the like.

In an embodiment, the connection operation directed at 406 may further include flagging or otherwise attaching an identifier to the connection of the electrically-powered accessory configured to be used with at least one of the vehicle, a trailer, and a transport container with the vehicle power system. Attachment of the flag or identifier may be based on the authentication level and the permitted connection, for example, when the connection operation is to an electrically-powered accessory configured to be used with at least one of the vehicle, a trailer, and a transport container that is not approved, but where the connection operation is allowed due to an authentication level such as a fleet operator or unit operator level, the electrically-powered accessory configured to be used with at least one of the vehicle, a trailer, and a transport container may store an identifier in memory logging this connection. The log of the connection operation may be entered based on the status data of the electrically-powered accessory configured to be used with at least one of the vehicle, a trailer, and a transport container. The log of the connection may indicate, for example, that a warranty has been breached.

Optionally, method 400 further includes monitoring for unauthorized access attempts 408. In an embodiment, monitoring for unauthorized access attempts at 408 includes monitoring electrical connections at the electrical connection point. For example, changes to current, voltage, or frequency may be indicative of unauthorized connections being attempted at the electrical connection point. In an embodiment, changes to current, voltage, or frequency that lack a signal corresponding to authentication information may be indicative of an unauthorized connection, where the authentication information is provided by way of the connection of the electrically-powered accessory configured to be used with at least one of the vehicle, a trailer, and a transport container to the vehicle power system. In an embodiment, monitoring for unauthorized access attempts at 408 includes detection of multiple failed attempts at authentication, for example where no authentication level can be obtained at 404 for authentication information provided at 402, or when large volumes of data indicative of a brute-force hacking attempt are received.

Method 400 further may optionally include disabling access to power at 410, when unauthorized access attempts are detected at 408. Disabling access to power may include, for example, shutting off power to the electrical connection point such as an electric power take-off, refusing to allow further authentication attempts such as suspending the obtaining of authentication information at 402. The disabling access to power may be, for example, for a predetermined time and/or until the vehicle power system is unlocked, for example by a user, dealer or maintenance personnel, such as through providing an unlocking code, either from a remote source or from a local source such as a maintenance tool, a vehicle key of a driver, or the like.

Aspects:

It is understood that any of aspects 1-8 can be combined with any of aspects 9-18 or 19-26. It is understood that any of aspects 9-18 may be combined with any of aspects 19-26.

Aspect 1. A vehicle power and accessory system, comprising:

an electrically-powered accessory configured to be used with at least one of the vehicle, a trailer, and a transport container; and a vehicle power system including:

a battery;

an electrical connection point; and a controller, configured to:

receive authentication information for the electrically powered accessory configured to be used with at least one of the vehicle, a trailer, and a transport container; and direct an operation of the electrical connection point based on an authentication level for the electrically powered accessory configured to be used with at least one of the vehicle, a trailer, and a transport container, wherein:

the electrically-powered accessory configured to be used with at least one of the vehicle, a trailer, and a transport container is connected to the electrical connection point; and the authentication level is based on the authentication information for the electrically powered accessory configured to be used with at least one of the vehicle, a trailer, and a transport container.

Aspect 2. The vehicle power and accessory system according to aspect 1, wherein the electrically powered accessory configured to be used with at least one of the vehicle, a trailer, and a transport container includes a wired connection to the vehicle power system and the controller is configured to receive the authentication information from the electrically powered accessory configured to be used with at least one of the vehicle, a trailer, and a transport container by way of the wired connection.

Aspect 3. The vehicle power and accessory system according to any of aspects 1-2, wherein the vehicle power system includes a wireless communications receiver, and the controller is configured to receive the authentication information from the wireless communications receiver.

Aspect 4. The vehicle power and accessory system according to any of aspects 1-3, wherein the controller is further configured to determine the authentication level based on the authentication information.

Aspect 5. The vehicle power and accessory system according to any of aspects 1-4, wherein the vehicle power system includes a wireless communication antenna, and the controller is further configured to:
direct transmission of the authentication information to a remote server by way of the wireless communication antenna; and
receive the authentication level from the remote server.

Aspect 6. The vehicle power and accessory system according to any of aspects 1-5, wherein the operation of the electrical connection point includes supplying power from the battery to the electrically powered accessory configured to be used with at least one of the vehicle, a trailer, and a transport container when the vehicle power and accessory system is in a vehicle-off mode.

Aspect 7. The vehicle power and accessory system according to any of aspects 1-6, wherein the operation of the electrical connection point includes supplying power to the electrically powered accessory configured to be used with at least one of the vehicle, a trailer, and a transport container when the vehicle power and accessory system is in a load-shedding mode.

Aspect 8. The vehicle power and accessory system according to any of aspects 1-7, wherein the operation of the electrical connection point includes certifying the electrically-powered accessory configured to be used with at least one of the vehicle, a trailer, and a transport container for use in the vehicle power and accessory system.

Aspect 9. A vehicle power system comprising:
a battery;
an electrical connection point configured to provide electrical power to an electrically-powered accessory configured to be used with at least one of the vehicle, a trailer, and a transport container;
a controller, configured to:
obtain authentication information for the electrically-powered accessory configured to be used with at least one of the vehicle, a trailer, and a transport container;
obtain an authentication level for the electrically-powered accessory configured to be used with at least one of the vehicle, a trailer, and a transport container; and
direct a connection operation between the vehicle power system and the electrically-powered accessory configured to be used with at least one of the vehicle, a trailer, and a transport container based on the authentication level of the electrically-powered accessory configured to be used with at least one of the vehicle, a trailer, and a transport container.

Aspect 10. The vehicle power system according to aspect 9, wherein the connection operation comprises supplying power from the vehicle power system to the electrical connection point.

Aspect 11. The vehicle power and accessory system according to any of aspects 9-10, wherein the supplying of power from the vehicle power system at the electrical connection point occurs while a vehicle including the vehicle power source is in an off state.

Aspect 12. The vehicle power and accessory system according to aspect 10, wherein the supplying of power from the vehicle power system at the electrical connection point occurs while a vehicle including the vehicle power source is in a load-shedding state.

Aspect 13. The vehicle power and accessory system according to and of aspects 9-12, wherein the connection operation comprises certifying the electrically-powered accessory configured to be used with at least one of the vehicle, a trailer, and a transport container for use with the vehicle power system and permitting a connection between the vehicle power system and the electrically-powered accessory configured to be used with at least one of the vehicle, a trailer, and a transport container at the electrical connection point.

Aspect 14. The vehicle power and accessory system according to and of aspects 9-13, wherein the vehicle power system further includes a wireless communication antenna, and the processor is configured to obtain the authentication information by receiving the authentication data from the wireless communication antenna.

Aspect 15. The vehicle power and accessory system according to and of aspects 9-13, wherein the controller is configured to obtain the authentication information by way of a wired connection between the vehicle power system and the electrically-powered accessory configured to be used with at least one of the vehicle, a trailer, and a transport container.

Aspect 16. The vehicle power and accessory system according to and of aspects 9-15, wherein the controller is configured to obtain the authentication level for the electrically-powered accessory configured to be used with at least one of the vehicle, a trailer, and a transport container by processing the authentication information from the vehicle power system to determine the authentication level.

Aspect 17. The vehicle power and accessory system according to and of aspects 9-15, wherein the vehicle power system further includes a wireless communication antenna, and the controller is configured to obtain the authentication level for the electrically-powered accessory configured to be used with at least one of the vehicle, a trailer, and a transport container by:
directing transmission of the authentication information from the vehicle power system to a remote server by way of the wireless communication antenna; and
receiving the authentication level for the electrically-powered accessory configured to be used with at least one of the vehicle, a trailer, and a transport container from the remote server by way of the wireless communication antenna.

Aspect 18. The vehicle power and accessory system according to and of aspects 9-17, wherein the controller is further configured to monitor the vehicle power system for an unauthorized access attempt and disabling at least a portion of the vehicle power system when the monitoring detects the unauthorized access attempt.

Aspect 19. A method of connecting an electrically-powered accessory configured to be used with at least one of the vehicle, a trailer, and a transport container to a vehicle power system, comprising: providing authentication information for the electrically-powered accessory configured to be used with at least one of the vehicle, a trailer, and a transport container to a vehicle power control of the vehicle power system; and
forming a permitted connection selected from a plurality of permitted connections between the electrically-powered accessory configured to be used with at least one of the vehicle, a trailer, and a transport container and the vehicle power system, wherein the permitted connection is selected based on an authentication level,
wherein the authentication information determines an authentication level of the accessory configured to be used with at least one of the vehicle, a trailer, and a transport container.

Aspect 20. The method according to aspect 19, The method of claim 19, wherein providing the authentication information comprises providing a signal including the authentication information by way of a wired connection configured to be connected to the vehicle power system.

Aspect 21. The method according to any of aspects 19-20, wherein providing the authentication information comprises wireless transmission of the authentication information from a portable device or the electrically-powered accessory configured to be used with at least one of the vehicle, a trailer, and a transport container to the vehicle power system, and the permitted connection includes the accessory configured to be used with at least one of the vehicle, a trailer, and a transport container receiving power from the vehicle power system.

Aspect 22. The method according to aspect 21, wherein the accessory configured to be used with at least one of the vehicle, a trailer, and a transport container receiving power from the vehicle power system occurs while a vehicle including the vehicle power source is in an off state.

Aspect 23. The method according to aspect 21, wherein the accessory configured to be used with at least one of the vehicle, a trailer, and a transport container receiving power from the vehicle power system occurs while the vehicle power source is in a load-shedding state.

Aspect 24. The method according to any of aspects 19-23, wherein providing the authentication information comprises providing authentication information from a maintenance tool to the vehicle power system, and the permitted connection includes certifying the accessory configured to be used with at least one of the vehicle, a trailer, and a transport container for use in the vehicle power system.

Aspect 25. The method according to any of aspects 19-24, wherein the permitted connection is established at an electronic power take-off of the vehicle power system.

Aspect 26. The method according to any of aspects 19-25, wherein the electrically-powered accessory configured to be used with at least one of the vehicle, a trailer, and a transport container is a transport climate control system.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A vehicle power and accessory system, comprising:
an electrically-powered accessory configured to be used with at least one of the vehicle, a trailer, and a transport container;
a remote server; and
a vehicle power system including:
  a battery;
  an electrical connection point;
  a wireless communication antenna; and
  a controller, configured to:
    receive authentication information for the electrically powered accessory configured to be used with at least one of the vehicle, a trailer, and a transport container;
    direct transmission of the authentication information to the remote server by way of the wireless communication antenna;
    receive an authentication level for the electrically powered accessory from the remote server; and
    direct an operation of the electrical connection point based on the authentication level for the electrically powered accessory configured to be used with at least one of the vehicle, a trailer, and a transport container,
wherein:
  the electrically-powered accessory configured to be used with at least one of the vehicle, a trailer, and a transport container is connected to the electrical connection point; and
  the authentication level is based on the authentication information for the electrically powered accessory configured to be used with at least one of the vehicle, a trailer, and a transport container,
  the remote server is configured to process the authentication information to determine the authentication level by combining the authentication information with a second source of authentication information, and
  the authentication level is selected from a plurality of authentication levels, each of the plurality of authentication levels having a different set of permitted connections, and wherein the operation is selected from within the set of permitted connections for the authentication level.

2. The vehicle power and accessory system of claim 1, wherein the electrically powered accessory configured to be used with at least one of the vehicle, a trailer, and a transport container includes a wired connection to the vehicle power system and the controller is configured to receive the authentication information from the electrically powered accessory configured to be used with at least one of the vehicle, a trailer, and a transport container by way of the wired connection.

3. The vehicle power and accessory system of claim 1, wherein the vehicle power system includes a wireless communications receiver, and the controller is configured to receive the authentication information from the wireless communications receiver.

4. The vehicle power and accessory system of claim 1, wherein the operation of the electrical connection point includes supplying power from the battery to the electrically powered accessory configured to be used with at least one of the vehicle, a trailer, and a transport container when the vehicle power and accessory system is in a vehicle-off mode.

5. The vehicle power and accessory system of claim 1, wherein one of the controller and the remote server is further configured to process status data to determine if the electrically powered accessory is in a normal operational state.

6. A vehicle power system comprising:
a remote server; and
a local system comprising:
  a battery;
  an electrical connection point configured to provide electrical power to an electrically-powered accessory configured to be used with at least one of the vehicle, a trailer, and a transport container;
  a wireless communication antenna; and
  a controller, configured to:
    obtain authentication information for the electrically-powered accessory configured to be used with at least one of the vehicle, a trailer, and a transport container;
    obtain an authentication level for the electrically-powered accessory configured to be used with at least one of the vehicle, a trailer, and a transport container by:

directing transmission of the authentication information from the vehicle power system to the remote server by way of the wireless communication antenna; and receiving the authentication level for the electrically-powered accessory configured to be used with at least one of the vehicle, a trailer, and a transport container from the remote server by way of the wireless communication antenna; and direct a connection operation between the vehicle power system and the electrically-powered accessory configured to be used with at least one of the vehicle, a trailer, and a transport container based on the authentication level of the electrically-powered accessory configured to be used with at least one of the vehicle, a trailer, and a transport container, wherein the remote server is configured to process the authentication information to determine the authentication level by combining the authentication information with a second source of authentication information, and the authentication level is selected from a plurality of authentication levels, each of the plurality of authentication levels having a different set of permitted connections, and wherein the connection operation is selected from within the set of permitted connections for the authentication level.

7. The vehicle power system of claim 6, wherein the connection operation comprises supplying power from the vehicle power system to the electrical connection point.

8. The vehicle power system of claim 6, wherein the connection operation comprises certifying the electrically-powered accessory configured to be used with at least one of the vehicle, a trailer, and a transport container for use with the vehicle power system and permitting a connection between the vehicle power system and the electrically-powered accessory configured to be used with at least one of the vehicle, a trailer, and a transport container at the electrical connection point.

9. The vehicle power system of claim 6, wherein the vehicle power system further includes a wireless communication antenna, and the processor is configured to obtain the authentication information by receiving the authentication data from the wireless communication antenna.

10. The vehicle power system of claim 6, wherein the controller is configured to obtain the authentication information by way of a wired connection between the vehicle power system and the electrically-powered accessory configured to be used with at least one of the vehicle, a trailer, and a transport container.

11. The vehicle power system of claim 6, wherein the controller is further configured to monitor the vehicle power system for an unauthorized access attempt and disabling at least a portion of the vehicle power system when the monitoring detects the unauthorized access attempt.

12. The vehicle power system of claim 6, wherein one of the controller and the remote server is further configured to process status data to determine if the electrically powered accessory is in a normal operational state.

13. A method of connecting an electrically-powered accessory configured to be used with at least one of the vehicle, a trailer, and a transport container to a vehicle power system, comprising:

providing authentication information for the electrically-powered accessory configured to be used with at least one of the vehicle, a trailer, and a transport container to a vehicle power control of the vehicle power system;

transmitting the authentication information from the vehicle power control to a remote server;

at the remote server, processing the authentication information to determine an authentication level by combining the authentication information with a second source of authentication information, forming a permitted connection selected from a plurality of permitted connections between the electrically-powered accessory configured to be used with at least one of the vehicle, a trailer, and a transport container and the vehicle power system, wherein the permitted connection is selected based on the authentication level, wherein the authentication information determines an authentication level of the accessory configured to be used with at least one of the vehicle, a trailer, and a transport container, and the authentication level is selected from a plurality of authentication levels, each of the plurality of authentication levels having a different set of permitted connections, and wherein the formed permitted connection is selected from within the set of permitted connections for the authentication level.

14. The method of claim 13, wherein providing the authentication information comprises providing a signal including the authentication information by way of a wired connection configured to be connected to the vehicle power system.

15. The method of claim 13, wherein providing the authentication information comprises wireless transmission of the authentication information from a portable device or the electrically-powered accessory configured to be used with at least one of the vehicle, a trailer, and a transport container to the vehicle power system, and the permitted connection includes the accessory configured to be used with at least one of the vehicle, a trailer, and a transport container receiving power from the vehicle power system.

16. The method of claim 13, wherein providing the authentication information comprises providing authentication information from a maintenance tool to the vehicle power system, and the permitted connection includes certifying the accessory configured to be used with at least one of the vehicle, a trailer, and a transport container for use in the vehicle power system.

17. The method of claim 13, wherein the permitted connection is established at an electronic power take-off of the vehicle power system.

18. The method of claim 13, wherein the electrically-powered accessory configured to be used with at least one of the vehicle, a trailer, and a transport container is a transport climate control system.

19. The method of claim 13, wherein processing the authentication information further includes processing status data to determine if the electrically powered accessory is in a normal operational state.

* * * * *